US011368345B2

(12) United States Patent
Tang

(10) Patent No.: US 11,368,345 B2
(45) Date of Patent: *Jun. 21, 2022

(54) PILOT SIGNAL TRANSMISSION METHOD, TERMINAL EQUIPMENT, AND NETWORK EQUIPMENT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,513

(22) Filed: Aug. 14, 2020

(65) Prior Publication Data

US 2020/0374171 A1 Nov. 26, 2020

Related U.S. Application Data

(63) Continuation of application No. 16/309,208, filed as application No. PCT/CN2016/092102 on Jul. 28, 2016, now Pat. No. 10,791,013.

(51) Int. Cl.
*H04L 27/26* (2006.01)
*H04L 5/00* (2006.01)
*H04W 72/04* (2009.01)

(52) U.S. Cl.
CPC ........ *H04L 27/2613* (2013.01); *H04L 5/0007* (2013.01); *H04L 5/0051* (2013.01);
(Continued)

(58) Field of Classification Search
CPC . H04L 27/2613; H04L 5/0007; H04L 5/0051; H04L 5/0078; H04L 27/2605;
(Continued)

(56) References Cited

U.S. PATENT DOCUMENTS 8,351,320 B2 1/2013 Cho
8,498,192 B2 7/2013 Bhushan
(Continued)

FOREIGN PATENT DOCUMENTS

CN 1773976 A 5/2006
CN 101390328 A 3/2009
(Continued)

OTHER PUBLICATIONS

Kela, Petteri, et al. "Location based beamforming in 5G ultra-dense networks." 2016 IEEE 84th Vehicular Technology Conference (VTC-Fall). IEEE, 2016. (Year: 2016).*
(Continued)

*Primary Examiner* — Sharad Rampuria

(57) ABSTRACT

The embodiments of the invention disclose a pilot signal transmission method, terminal equipment, and network equipment. The method comprises: terminal equipment determines, from a plurality of pilot patterns, a first pilot pattern; the terminal equipment determines, according to the first pilot pattern, a time-frequency resource used to transmit a pilot signal; and the terminal equipment transmits or receives, using the time-frequency resource, the pilot signal. In the embodiments of the invention, the pilot signal transmission method, terminal equipment, and network equipment can flexibly adjust pilot density and physical resources, thereby reducing pilot overhead.

20 Claims, 6 Drawing Sheets

(52) U.S. Cl.
CPC ........ *H04L 5/0078* (2013.01); *H04L 27/2605* (2013.01); *H04W 72/042* (2013.01)

(58) Field of Classification Search
CPC ... H04L 5/0085; H04L 5/0053; H04L 5/0048; H04L 27/2666; H04L 27/2678; H04W 72/042; H04W 24/10; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 10,791,013 | B2* | 9/2020 | Tang .................... H04L 5/0051 |
| 2007/0195688 | A1 | 8/2007 | Bhushan |
| 2011/0051827 | A1 | 3/2011 | Cho |
| 2014/0016622 | A1 | 1/2014 | Bao |
| 2014/0269520 | A1 | 9/2014 | Yi et al. |
| 2014/0286255 | A1 | 9/2014 | Nam et al. |
| 2015/0036631 | A1 | 2/2015 | Yang et al. |
| 2015/0256262 | A1 | 9/2015 | Corp |
| 2015/0282123 | A1 | 10/2015 | Miao |
| 2016/0100398 | A1 | 4/2016 | Xia et al. |
| 2018/0367274 | A1* | 12/2018 | Shi ........................ H04L 1/1614 |

FOREIGN PATENT DOCUMENTS

| | | |
|---|---|---|
| CN | 101394262 A | 3/2009 |
| CN | 104301067 A | 1/2015 |
| CN | 105191461 A | 12/2015 |
| JP | 2008035288 A | 2/2008 |
| JP | 2009527996 A | 7/2009 |
| JP | 2016517200 A | 6/2016 |
| RU | 2510586 C2 | 3/2014 |
| WO | 2011025131 A2 | 3/2011 |
| WO | 2013155710 A1 | 10/2013 |
| WO | 2014015726 A1 | 1/2014 |
| WO | 2015168940 A1 | 11/2015 |

OTHER PUBLICATIONS

Mohamed, Abdelrahim, et al. "Correlation-based adaptive pilot pattern in control/data separation architecture." 2015 IEEE International Conference on Communications (ICC). IEEE, 2015. (Year: 2015).*
Third Office Action of the Canadian application No. 3032007, dated Jul. 9, 2021.
Notice of Allowance of the Australian application No. 2016416207, dated Jul. 20, 2021.
Third Office Action of the European application No. 16910091.4, dated Sep. 30, 2021.
Office Action of the Taiwanese application No. 106123116, dated Oct. 30, 2020.
First Office Action of the Iseral's application No. 264480, dated Oct. 25, 2020.
Office Action of the Indian application No. 201917006531, dated Sep. 26, 2020.
Second Office Action of the Canadian application No. 3032007, dated Sep. 18, 2020.
First Office Action of the Brazilian application No. BR1120190017232, dated Aug. 11, 2020.
Second Office Action of the Chilean application No. 201900223, dated Aug. 7, 2020.
Corrected Notice of Allowance of the U.S. Appl. No. 18/309,208, dated Aug. 20, 2020.
Second Office Action of the European application No. 16910091.4, dated Feb. 2, 2021.
Office Action of the Australian application No. 2016416207, dated Mar. 25, 2021.
Second Office Action of the Japanese application No. 2019-504054, dated Mar. 26, 2021.
First Office Action of the Indonesian application No. P00201901761, dated Apr. 6, 2021.
International Search Report in international application No. PCT/CN2016/092102, dated Feb. 21, 2017.
English translation of the Written Opinion of the International Search Authority in the international application No. PCT/CN2016/092102, dated Feb. 21, 2017.
Supplementary European Search Report in the European application No. 16910091.4, dated May 17, 2019.
First Office Action of the Russian application No. 2019105091, dated Aug. 22, 2019.
First Office Action of the European application No. 16910091.4, dated Jun. 19, 2020.
First Office Action of the Chinese application No. 201680088033.3, dated Mar. 19, 2020.
Second Office Action of the Chinese application No. 201680088033.3, dated Jul. 1, 2020.
3GPP TS 36.211 V13.2.0 (Jun. 2016); 3rd Generation Partnership Project; Technical Specification Group Radio Access Network; Evolved Universal Terrestrial Radio Access (E-UTRA); Physical channels and modulation (Release 13), Jun. 28, 2016.
First Office Action of the Japanese application No. 2019-504054, dated Jul. 28, 2020.
Written Opinion of the Singaporean application No. 11201900777X, dated Apr. 7, 2020.
First Office Action of the Chilean application No. 201900223, dated Dec. 9, 2019.
First Office Action of the Canadian application No. 3032007, dated Dec. 30, 2019.
Non-final Office Action of the U.S. Appl. No. 16/309,208, dated Feb. 3, 2020.
Notice of Allowance of the U.S. Appl. No. 16/309,208, dated May 13, 2020.
Corrected Notice of Allowance of the U.S. Appl. No. 16/309,208, dated Jun. 30, 2020.
First Office Action of the Mexican application No. MX/a/2019/001219, dated Feb. 4, 2022.
Fourth Office Action of the Canadian application No. 3032007, dated Apr. 25, 2022.

* cited by examiner

PILOT SIGNAL TRANSMISSION METHOD, TERMINAL EQUIPMENT, AND NETWORK EQUIPMENT

CROSS-REFERENCE TO RELATED APPLICATIONS

The application is a continuation application of U.S. patent application Ser. No. 16/309,208 filed on Dec. 12, 2018, which is the US national phase of PCT Application No. PCT/CN2016/092102 filed on Jul. 28, 2016, the disclosure of which is incorporated by reference herein in their entity.

TECHNICAL FIELD

The embodiments of the disclosure relate to the field of communications, and particularly relate to a method for transmitting a pilot signal, a terminal device and a network side device.

BACKGROUND

In a 5th-Generation (5G) system, a terminal device needs to support the transmission under various movement speeds, specifically including a high-speed scene up to 350 km/h and a common low-speed scene. When the movement speed of the terminal device is different, the channel change rate is also different. In order to track the change of a channel within a coherence time of the channel, a pilot for signal measurement or signal demodulation needs a corresponding density to guarantee the accuracy of channel estimation. For example, during a high-speed movement, a high pilot density is required to track the change of the channel; and during a low-speed movement, a low pilot density may be adopted to reduce the overhead. However, the current existing problem is that in existing technical solutions, the pilot density and a physical resource cannot flexibly be adjusted so that the high pilot overhead is caused. Therefore, there is an urgent need for a method to solve this problem.

SUMMARY

The embodiments of the disclosure provide a method for transmitting a pilot signal, a terminal device and a network side device, which can flexibly adjust the pilot density and a physical resource to reduce the pilot overhead.

In a first aspect, a method for transmitting a pilot signal is provided, which may include the following operations.

A terminal device determines a first pilot pattern from multiple pilot patterns.

The terminal device determines a time-frequency resource for transmitting the pilot signal according to the first pilot pattern.

The terminal device sends or receives the pilot signal on the time-frequency resource.

In the embodiments of the disclosure, the terminal device may determine the first pilot pattern from the multiple pilot patterns and determine the time-frequency resource for transmitting the pilot signal according to the first pilot pattern, so that the pilot density and the occupied physical resource can be adjusted flexibly.

Optionally, the pilot signal may specifically include a reference signal defined by various Rel versions in an LTE such as a Demodulation Reference Signal (DMRS), a Cell-specific Reference Signal (CRS), a Channel State Information Reference Signal (CSI-RS), a Positioning Reference Signal (PRS), a Discovery Reference Signal (DRS) or a Multimedia Broadcast multicast service Single Frequency Network-Reference Signal (MBSFN-RS). Optionally, the pilot signal may also be a reference signal newly defined in the 5G.

In the embodiments of the disclosure, the pilot patterns indicate Resource Elements (REs) occupied for transmitting the pilot signal in a certain time-domain resource area.

Optionally, the multiple pilot patterns may be predetermined in advance by the terminal device and a network side device, or, may also be indicated to the terminal device by the network side device. For example, the network side device may indicate the multiple pilot patterns to the terminal device via a high-level signaling such as a Radio Resource Control (RRC) signaling, which is not limited hereto.

Optionally, in some possible implementation manners, the method may further include the following operations.

Before the terminal device determines the first pilot pattern from the multiple pilot patterns, the terminal device receives indication information sent by the network device, here, the indication information is used for indicating the multiple pilot patterns.

Optionally, in some possible implementation manners, the multiple pilot patterns are provided with different pilot resource densities, where the pilot resource densities include at least one of a time-domain resource density or a frequency-domain resource density.

Herein, the time-domain resource density refers to the number of time-domain transmission units spaced between adjacent pilot resources in a time domain, and the frequency-domain resource density refers to the number of frequency-domain transmission units spaced between adjacent pilot resources in a frequency domain. Each of the time-domain transmission units is a basic unit of a time-domain physical resource for transmitting the signal, and may be a sub-frame, a Transmission Time Interval (TTI), a time slot, an Orthogonal Frequency Division Multiplexing (OFDM) symbol or an RE, etc. Each of the frequency-domain transmission units is a basic unit of a frequency-domain physical resource for transmitting the signal, and may be a sub-carrier, a Physical Resource Block (PRB) and a sub-band, etc.

Optionally, in some possible implementation manners, the terminal device determines the first pilot pattern from the multiple pilot patterns may include the following operations.

The terminal device determines the first pilot pattern from the multiple pilot patterns according to at least one of: pilot pattern configuration information sent by the network side device; information of a transmission mode used for data transmitted on a time-domain resource same as a time-domain resource transmitting the pilot signal or on a frequency-domain resource same as a frequency-domain resource transmitting the pilot signal; movement speed estimation value information of the terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Optionally, in some possible implementation manners, the terminal device determines the first pilot pattern according to a corresponding relationship between movement speed estimation values and the pilot patterns. Herein, the corresponding relationship may be predetermined by the network side device and the terminal device, or is indicated by the network side device.

Optionally, in some possible implementation manners, the terminal device determines the first pilot pattern according to a corresponding relationship between transmission modes used for the data transmitted on a time-domain resource same as a time-domain resource transmitting the pilot signal or on a frequency-domain resource same as a frequency-domain resource transmitting the pilot signal and the pilot patterns. Herein, the corresponding relationship may be predetermined by the network side device and the terminal device, or is indicated by the network side device.

Optionally, in some possible implementation manners, the terminal device determines the first pilot pattern according to a corresponding relationship between numerologies for transmitting the pilot signal or for the data transmitted on a time-domain resource same as a time-domain resource transmitting the pilot signal or on a frequency-domain resource same as a frequency-domain resource transmitting the pilot signal and the pilot patterns. Herein, the corresponding relationship may be predetermined by the network side device and the terminal device, or is indicated by the network side device.

Optionally, in some possible implementation manners, the method may further include the following operations.

The terminal device receives the pilot pattern configuration information, which is indicated by first Downlink Control Information (DCI), from the network side device, where the first DCI is used for scheduling the data transmitted on a time-domain resource same as a time-domain resource transmitting the pilot signal or on a frequency-domain resource same as a frequency-domain resource transmitting the pilot signal.

Herein, the terminal device determines the first pilot pattern from the multiple pilot patterns may include: the terminal device determines the first pilot pattern from the multiple pilot patterns according to the pilot pattern configuration information indicated by the first DCI.

Optionally, in some possible implementation manners, the method may further include the following operations.

Before the terminal device determines the first pilot pattern from the multiple pilot patterns according to the pilot pattern configuration information indicated by the first DCI, the terminal device reports the movement speed estimation value information to the network side device, where the movement speed estimation value information is used by the network side device for determining the pilot pattern configuration information.

Optionally, in some possible implementation manners, the numerology information includes at least one of: a sub-carrier spacing, the number of sub-carriers under a special bandwidth, the number of sub-carriers in a PRB, the length of an OFDM symbol, the number of points of Fourier transform or inverse Fourier transform for generating an OFDM signal, the number of OFDM symbols in a TTI, the number of TTIs in a predetermined duration or the length of a signal prefix.

Herein, the sub-carrier spacing refers to a frequency spacing between adjacent sub-carriers, such as 15 kHz and 60 kHz; the number of sub-carriers under the special bandwidth may be, for example, the number of sub-carriers corresponding to each possible system bandwidth; the number of sub-carriers in the PRB typically may be, for example, an integer multiple of 12; the number of OFDM symbols in the TTI typically may be, for example, an integer multiple of 14; the number of TTIs in a certain time unit may be the number of TTIs within the 1 ms or 10 ms, and the length of the signal prefix may be, for example, the duration of a Cyclic Prefix (CP) of a signal, or a normal CP or an extended CP.

Optionally, in some possible implementation manners, the method may further include the following operations.

After the terminal device determines the first pilot pattern from the multiple pilot patterns, the terminal device reports information of the first pilot pattern to the network side device.

The terminal device may report the information of the first pilot pattern to the network side device by an uplink control channel, so that the network side device can determine a resource position of the pilot signal and thus perform channel estimation based on the pilot signal.

Optionally, in some possible implementation manners, the multiple pilot patterns include a zero pilot pattern, and the zero pilot pattern indicates that no time-frequency resource is used for transmitting the pilot signal.

For example, when the movement speed of the terminal device is slow, the multiple pilot patterns may include the zero pilot pattern. For example, in four pilot patterns, one OFDM signal is occupied by the pilot pattern 2, two OFDM signals are occupied by the pilot pattern 3, three OFDM signals are occupied by the pilot pattern 4 and no OFDM signal is occupied by the pilot pattern 1, where the pilot pattern 1 is the zero pilot pattern.

In other words, the multiple pilot patterns at least include one pilot pattern in which a pilot resource is unused. "Pilot Resource Unused" indicates that the pilot signal does not need to be transmitted in a current transmission time unit.

In a second aspect, a method for transmitting a pilot signal is provided, which may include the following operations.

A network side device determines a first pilot pattern from multiple pilot patterns.

The network side device determines a time-frequency resource for transmitting the pilot signal according to the first pilot pattern.

The network side device sends or receives the pilot signal on the time-frequency resource.

In the embodiments of the disclosure, the network side device may determine the first pilot pattern from the multiple pilot patterns and determine the time-frequency resource for transmitting the pilot signal according to the first pilot pattern, so that the pilot density and the occupied physical resource can be adjusted flexibly.

Optionally, the first pilot pattern is used for indicating REs occupied for transmitting the pilot signal in a certain time-domain resource area.

Optionally, the multiple pilot patterns may be predetermined in advance by a terminal device and the network side device, or, may also be indicated to the terminal device by the network side device. For example, the network side device may indicate the multiple pilot patterns to the terminal device by a high-level signaling such as an RRC signaling, which is not limited hereto.

Optionally, in some possible implementation manners, the method may further include the following operations.

Before the network side device determines the first pilot pattern from the multiple pilot patterns, the network side device sends indication information to the terminal device, here, the indication information is used for indicating the multiple pilot patterns.

Optionally, in some possible implementation manners, the multiple pilot patterns are provided with different pilot resource densities, where the pilot resource densities include at least one of a time-domain resource density or a frequency-domain resource density.

Herein, the time-domain resource density refers to the number of time-domain transmission units spaced between adjacent pilot resources in a time domain, and the frequency-domain resource density refers to the number of frequency-domain transmission units spaced between adjacent pilot resources in a frequency domain. Each of the time-domain transmission units is a basic unit of a time-domain physical resource for transmitting the signal, and may be a sub-frame, a TTI, a time slot, an OFDM symbol or an RE, etc. Each of the frequency-domain transmission units is a basic unit of a frequency-domain physical resource for transmitting the signal, and may be a sub-carrier, a PRB and a sub-band, etc.

Optionally, in some possible implementation manners, the network side device determines the first pilot pattern from the multiple pilot patterns may include the following operations.

The network side device determines the first pilot pattern from the multiple pilot patterns according to at least one of: information of a transmission mode used for data transmitted on a time-domain resource same as a time-domain resource transmitting the pilot signal or on a frequency-domain resource same as a frequency-domain resource transmitting the pilot signal; movement speed estimation value information of the terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Optionally, in some possible implementation manners, the numerology information includes at least one of: a sub-carrier spacing, the number of sub-carriers under a special bandwidth, the number of sub-carriers in a PRB, the length of an OFDM symbol, the number of points of Fourier transform or inverse Fourier transform for generating an OFDM signal, the number of OFDM symbols in a TTI, the number of TTIs in a predetermined duration or the length of a signal prefix.

Herein, the sub-carrier spacing refers to a frequency spacing between adjacent sub-carriers, such as 15 kHz and 60 kHz; the number of sub-carriers under the special bandwidth may be, for example, the number of sub-carriers corresponding to each possible system bandwidth; the number of sub-carriers in the PRB typically may be, for example, an integer multiple of 12; the number of OFDM symbols in the TTI typically may be, for example, an integer multiple of 14; the number of TTIs in a certain time unit may be the number of TTIs within the 1 ms or 10 ms, and the length of the signal prefix may be, for example, the duration of a CP of a signal, or a normal CP or an extended CP.

Optionally, in some possible implementation manners, the method may further include the following operations.

After the network side device determines the first pilot pattern from the multiple pilot patterns, the network side device sends to the terminal device pilot pattern configuration information indicated by first DCI, where the first DCI is used for scheduling the data transmitted on the time-domain resource same as the time-domain resource transmitting the pilot signal or on the frequency-domain resource same as the frequency-domain resource transmitting the pilot signal, and the pilot pattern configuration information is used for indicating the first pilot pattern.

Optionally, in some possible implementation manners, the method may further include the following operations.

The network side device receives the movement speed estimation value information sent by the terminal device.

Herein, the network side device determines the first pilot pattern from the multiple pilot patterns may include: the network side device determines the first pilot pattern from the multiple pilot patterns according to the movement speed estimation value information.

Optionally, in some possible implementation manners, the method may further include: the network side device receives information of the first pilot pattern reported by the terminal device.

The network side device determines a resource position of the pilot signal according to the received information of the first pilot pattern and thus performs channel estimation based on the pilot signal.

Optionally, in some possible implementation manners, the multiple pilot patterns include a zero pilot pattern, and the zero pilot pattern indicates that no time-frequency resource is used for transmitting the pilot signal.

In other words, the multiple pilot patterns at least include one pilot pattern in which the pilot resource is unused. "Pilot Resource Unused" indicates that the pilot signal does not need to be transmitted in a current transmission time unit.

In the embodiments of the disclosure, the pilot patterns indicate REs for transmitting the pilot signal.

In a third aspect, a terminal device is provided, which is configured to execute the method in the first aspect or any possible implementation manner of the first aspect. Specifically, the terminal device includes units configured to execute the method in the first aspect or any possible implementation manner of the first aspect.

In a fourth aspect, a network side device is provided, which is configured to execute the method in the second aspect or any possible implementation manner of the second aspect. Specifically, the network side device includes units configured to execute the method in the second aspect or any possible implementation manner of the second aspect.

In a fifth aspect, a terminal device is provided. The terminal device includes a processor, a memory and a communication interface. The processor is connected with the memory and the communication interface. The communication interface is configured to communicate with other network elements under a control of the processor. The memory is configured to store an instruction that, when executed by the processor, cause the processor to perform the method in the first aspect or any possible implementation manner of the first aspect.

In a sixth aspect, a network side device is provided. The network side device includes a processor, a memory and a communication interface. The processor is connected with the memory and the communication interface. The communication interface is configured to communicate with other network elements under a control of the processor. The memory is configured to store an instruction that, when executed by the processor, causes the processor to perform the method in the second aspect or any possible implementation manner of the second aspect.

In a seventh aspect, a computer readable storage medium is provided. The computer readable storage medium stores a program; and the program enables the terminal device to execute any method for transmitting the pilot signal in the first aspect and in various implementation manners thereof.

In eighth aspect, a computer readable storage medium is provided. The computer readable storage medium stores a program; and the program enables a network side device to execute any method for transmitting the pilot signal in the second aspect and in various implementation manners thereof.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

A clear and complete description of the technical solutions in the disclosure will be given below, in combination with the accompanying drawings in the embodiments of the disclosure. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

It should be understood that the technical solutions of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system and other existing communication systems, and may be particularly applied to a future 5G system.

It should be understood that the network side device in the embodiments of the disclosure may also be referred to as a network device or a base station, etc. The base station may be a Base Transceiver Station (BTS) in a GSM or CDMA, may also be a NodeB in a WCDMA, may further be an Evolutional Node B (eNB or eNodeB) in an LTE, or may be a base station device in a future 5G network, all of which are not limited by the disclosure hereto.

It should be further understood that the terminal device in the embodiments of the disclosure may communicate with one or more core networks via a Radio Access Network (RAN). The terminal device may be referred to as User Equipment (UE), an access terminal, a user unit, a user station, a mobile station, a mobile platform, a remote station, a remote terminal, a mobile device, a user terminal, a terminal, a wireless communication device and a user proxy or user apparatus. The terminal device may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modulator-demodulator, vehicle-amounted devices, wearable devices, and a terminal device in a future 5G network.

Figure 1:
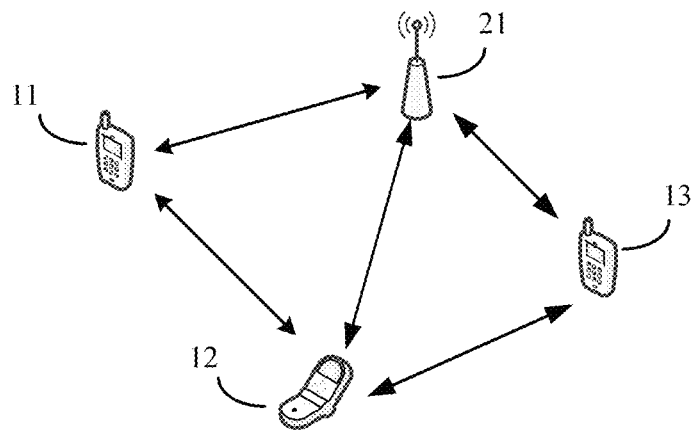
FIG. 1 is a schematic diagram of an application scene in an embodiment of the disclosure.

FIG. 1 illustrates a systematic diagram of a scene. It should be understood that for the convenience of understanding, the introduced scene in FIG. 1 is for example in the description and is not constituted as a limit to the disclosure. A terminal device 11, a terminal device 12, a terminal device 13 and a base station 21 are illustrated in FIG. 1.

As illustrated in FIG. 1, the terminal device 11 may communicate with the base station 21, the terminal device 12 may communicate with the base station 21 and the terminal device 13 may communicate with the base station 21. Or the terminal device 12 may also communicate with the terminal device 11. Or as another case, the terminal device 13 communicates with the terminal device 12. Herein, no matter whether the terminal device communicates with the base station or the terminal device communicates with the terminal device, a time-frequency physical resource may be determined according to a pilot pattern and thus a pilot signal is sent or received on the time-frequency physical resource. The pilot pattern indicates RE(s) occupied for transmitting the pilot signal in a certain time-domain resource area, for example, the RE(s) occupied by the pilot signal within a resource range of one PRB of one sub-frame. Herein, the "pilot signal" may also be abbreviated as a "pilot".

However, in an existing pilot transmission technology, the selection of the pilot pattern is completely decided based on the network side device and the terminal device cannot select the pilot pattern. Additionally, since the 5G system needs to support various speed scenes of the terminal device, and the network side device or the terminal device cannot adaptively select a time-frequency resource required to transmit the pilot according to changes of various scenes and also cannot flexibly adjust the pilot density, the terminal device or the network side device in the disclosure attempts to flexibly adjust the pilot density and occupied physical resource according to a change of a current channel state or other transmission parameters.

Figure 2:
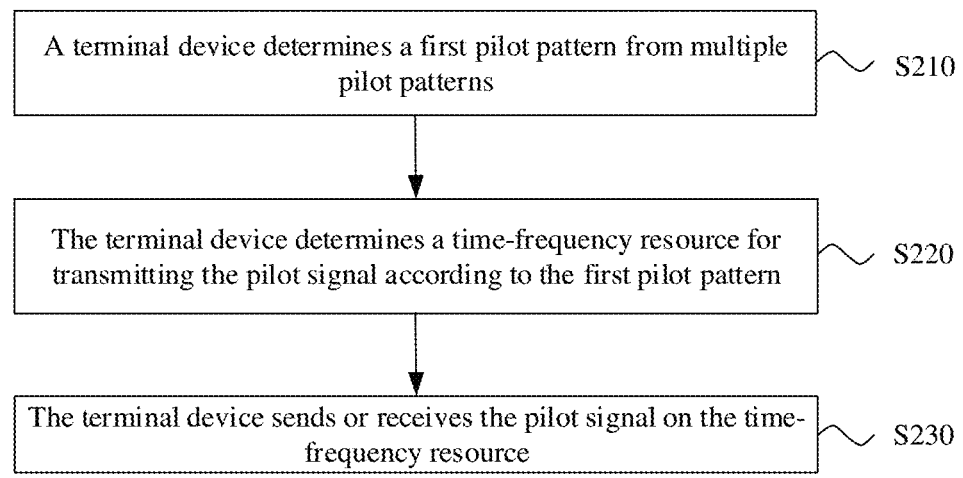
FIG. 2 is a schematic flowchart of a method for transmitting a pilot signal according to an embodiment of the disclosure.

FIG. 2 illustrates a schematic flowchart of a method 200 for transmitting a pilot signal according to an embodiment of the disclosure. The method 200 may be executed by a terminal device. For example, the terminal device may be the terminal device 11, the terminal device 12 or the terminal device 13 in FIG. 1. As illustrated in FIG. 2, the method 200 may include the following operations.

At S210, a terminal device determines a first pilot pattern from multiple pilot patterns.

Specifically, the terminal device may select the first pilot pattern from the multiple pilot patterns.

In this embodiment of the disclosure, the pilot patterns indicate REs occupied for transmitting the pilot signal in a certain time-domain resource area.

Optionally, the pilot signal may specifically include a reference signal defined by various Rel versions in an LTE such as a DMRS, a CRS, a CSI-RS, a PRS, a DRS or an MBSFN-RS. Optionally, the pilot signal may also be a reference signal newly defined in the 5G.

Optionally, the multiple pilot patterns may be predetermined in advance by the terminal device and a network side device, or, may also be indicated to the terminal device by a network side device. For example, the network side device may indicate the multiple pilot patterns to the terminal device by a high-level signaling such as an RRC signaling, which is not limited hereto.

Optionally, the multiple pilot patterns may be pilot pattern subsets determined by the terminal device or the network device, that is, the terminal device or the network device may determine the pilot pattern subsets in an appointed pilot pattern set.

It should be understood that the first pilot pattern is a pilot pattern suitable for use by the terminal device, and the term "first" is merely for the convenience of description and is not constituted into a specific limit to the disclosure.

Optionally, before the S210, the method may further include the following operations.

The terminal device receives indication information sent by the network device, here, the indication information is used for indicating the multiple pilot patterns.

In other words, the terminal device may receive the multiple pilot patterns sent by the network device via the indication information.

At S220, the terminal device determines a time-frequency resource for transmitting the pilot signal according to the first pilot pattern.

Specifically, the terminal device may determine a time-frequency physical resource for transmitting the pilot signal according to the first pilot pattern.

At S230, the terminal device sends or receives the pilot signal on the time-frequency resource.

Specifically, after the determination of the time-frequency physical resource according to the first pilot pattern, the terminal device may send an uplink pilot signal on the time-frequency physical resource, or may also receive a downlink pilot signal on the time-frequency physical resource.

In the embodiment of the disclosure, the terminal device may determine the first pilot pattern from the multiple pilot patterns and determine the time-frequency resource for transmitting the pilot signal according to the first pilot pattern, so that the pilot density and the occupied physical resource can be adjusted flexibly.

Optionally, in the embodiment of the disclosure, the multiple pilot patterns are provided with different pilot resource densities, where the pilot resource densities include at least one of a time-domain resource density or a frequency-domain resource density.

Specifically, the time-domain resource density refers to the number of time-domain transmission units spaced between adjacent pilot resources in a time domain, and the frequency-domain resource density refers to the number of frequency-domain transmission units spaced between adjacent pilot resources in a frequency domain. Each of the time-domain transmission units is a basic unit of a time-domain physical resource for transmitting the signal, and may be a sub-frame, a TTI, a time slot, an OFDM symbol or an RE, etc. Each of the frequency-domain transmission units is a basic unit of a frequency-domain physical resource for transmitting the signal, and may be a sub-carrier, a PRB and a sub-band, etc. For example, the numbers of OFDM symbols, which are occupied by pilot resources in different pilot patterns, in a sub-frame are different, or the numbers of sub-frames, which are occupied by the pilot resources in different pilot patterns, in a wireless frame is different. Also for example, the numbers of sub-carriers, which are occupied by pilot resources in different pilot patterns, in a PRB are different, or the numbers of sub-carriers, which are occupied by pilot resources in different pilot patterns, in a sub-band are different, or the numbers of sub-carriers, which are occupied by pilot resources in different pilot patterns, in a bandwidth are different.

In this way, concerning the multiple pilot patterns having different pilot resource densities, the terminal device may select an appropriate pilot pattern for pilot transmission according to an own actual condition; or the network side device may select an appropriate pilot pattern for the terminal device according to an actual change condition of a current channel; and therefore, the purpose of flexibly adjusting the pilot density and the occupied physical resource is achieved.

Optionally, as an embodiment, the S210 may include the following operations.

The terminal device determines the first pilot pattern from the multiple pilot patterns according to at least one of: pilot pattern configuration information sent by the network side device; information of a transmission mode used for data transmitted on a time-domain resource same as a time-domain resource transmitting the pilot signal or on a frequency-domain resource same as a frequency-domain resource transmitting the pilot signal; movement speed estimation value information of the terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Specifically, the terminal device may take at least one of the aforementioned types of information as a judgment factor and select an appropriate pattern, i.e., the first pilot pattern, from the multiple pilot patterns. In order to understand how the terminal device determines the first pilot pattern according to at least one of the aforementioned types of information more clearly, each of at least one of the aforementioned types of information will be described below in detail.

Optionally, as an embodiment, for the "pilot pattern configuration information sent by the network side device", specifically, the terminal device may receive the pilot pattern configuration information sent by the network side device and the pilot pattern configuration information is configuration information indicating the first pilot pattern. In other words, the network side device may select the appropriate pilot pattern for the terminal device. Herein, the pilot pattern configuration information may be indicated by the network side device through a high-level signaling, or, may be indicated by the network side device through a DCI signaling.

Optionally, as an embodiment, the method may further include the following operations.

The terminal device receives the pilot pattern configuration information, which is indicated by first DCI, from the network side device, where the first DCI is used for scheduling data transmitted on a time-domain resource same as a time-domain resource transmitting the pilot signal or on a frequency-domain resource same as a frequency-domain resource transmitting the pilot signal.

Herein, the terminal device determines the first pilot pattern from the multiple pilot patterns may include: the terminal device determines the first pilot pattern from the multiple pilot patterns according to the pilot pattern configuration information indicated by the first DCI.

Specifically, the terminal device may receive the pilot pattern configuration information, which is indicated by the first DCI, from the network side device, and thus select the first pilot pattern from the multiple pilot patterns according to the pilot pattern configuration information indicated by the first DCI. For example, the network side device indicates the pilot pattern used for the terminal device using two bits in the first DCI. Herein, the first DCI is for scheduling data transmitted on a time-domain resource same as a time-domain resource transmitting the pilot signal or on a frequency-domain resource same as a frequency-domain resource transmitting the pilot signal. The pilot pattern configuration information is a pilot pattern for scheduling data transmitted on a time-domain resource same as a time-domain resource transmitting the pilot signal or on a frequency-domain resource same as a frequency-domain resource transmitting the pilot signal.

Therefore, the terminal device can determine the first pilot pattern according to the pilot pattern configuration information and thus flexibly adjust the pilot density and the occupied physical resource.

Optionally, as an embodiment, for the "information of a transmission mode used for data transmitted on a time-domain resource same as a time-domain resource transmitting the pilot signal or on a frequency-domain resource same as a frequency-domain resource transmitting the pilot signal", specifically, the terminal device may select the first pilot pattern according to the transmission mode used for the data transmitted on the time-domain resource same as the time-domain resource transmitting the pilot signal or on the frequency-domain resource same as the frequency-domain resource transmitting the pilot signal as well as a corresponding relationship between the transmission mode and the pilot pattern. Herein, the "time-domain resource" may be a transmission time unit such as a sub-frame, a time slot, a TTI, an OFDM symbol and a wireless frame, and may also be a transmission time unit newly defined in the 5G. The "frequency-domain resource" may be a sub-band, a PRB, a carrier or a bandwidth, etc.

It is to be noted that the corresponding relationship between the transmission mode and the pilot pattern may be appointed by the network side device and the terminal device in advance; or the network side device may directly send indication information to the terminal device, and the indication information is used for indicating corresponding pilot patterns under different transmission modes. For example, the transmission mode A and the transmission mode B correspond to the pilot pattern 1, and the transmission C corresponds to the pilot pattern 2.

For example, as a typical application, in a high-speed scene, a steady transmission mode such as an open-loop Multiple-Input Multiple-Output (MIMO) is used by the terminal device and the open-loop transmission mode corresponds to the pilot pattern 1. In a low-speed scene, a transmission mode with high spectral efficiency such as a closed-loop MIMO is used by the terminal device and the closed-loop transmission mode corresponds to the pilot pattern 2.

Therefore, the terminal device may determine the first pilot pattern according to the transmission mode used for the data transmitted on the time-domain resource same as the time-domain resource transmitting the pilot signal or on the frequency-domain resource same as the frequency-domain resource transmitting the pilot signal as well as the corresponding relationship between the transmission mode and the pilot pattern, and thus flexibly adjusts the pilot density and the occupied physical resource.

Optionally, as an embodiment, for the "movement speed estimation value information of the terminal device", specifically, the terminal device may select the first pilot pattern according to a current movement speed estimation value as well as a corresponding relationship between the movement speed estimation value and the pilot pattern. During specific implementation, the terminal device may estimate a movement speed value based on the sent pilot signal or data signal to obtain the current movement speed estimation value, and then selects the first pilot pattern corresponding to the current movement speed estimation value according to a corresponding relationship between a speed range of the movement speed estimation value and the pilot pattern.

It is to be noted that the corresponding relationship between the movement speed estimation value and the pilot pattern may be appointed by the network side device and the terminal device in advance; or the network side device may directly send indication information to the terminal device, and the indication information is used for indicating pilot patterns corresponding to different movement speed estimation values. For example, the corresponding relationship between the movement speed range and the pilot pattern may be as illustrated in table 1.

TABLE 1

Corresponding Relationship between Movement Speed Range and Pilot Pattern

| Movement speed | Pilot pattern |
| --- | --- |
| 0-3 km | Pilot pattern 1 |
| 3-30 km | Pilot pattern 2 |
| 30-120 km | Pilot pattern 3 |
| 120-350 km | Pilot pattern 4 |
| greater than 350 km | Pilot pattern 5 |

In the table 1, when the movement speed estimation value of the terminal device is within 0-3 km, the corresponding pilot pattern is the pilot pattern 1; when the movement speed estimation value of the terminal device is within 3-30 km, the corresponding pilot pattern is the pilot pattern 2; when the movement speed estimation value of the terminal device is within 30-120 km, the corresponding pilot pattern is the pilot pattern 3; when the movement speed estimation value of the terminal device is within 120-350 km, the corresponding pilot pattern is the pilot pattern 4; and when the movement speed estimation value of the terminal device is greater than 350 km, the corresponding pilot pattern is the pilot pattern 5.

In this way, the terminal device may select the first pilot pattern according to the corresponding relationship between the movement speed estimation value and the pilot pattern under different movement speed scenes and thus flexibly adjusts the pilot density and the occupied physical resource.

Optionally, as an embodiment, for the "numerology information for transmitting the pilot signal or for data transmitted on a time-domain resource same as a time-domain resource transmitting the pilot signal or on a frequency-domain resource same as a frequency-domain resource transmitting the pilot signal", specifically, the terminal device may select the first pilot pattern according to the numerology information for transmitting the pilot signal or for data transmitted on a time-domain resource same as a time-domain resource transmitting the pilot signal or on a frequency-domain resource same as a frequency-domain resource transmitting the pilot signal as well as according to a corresponding relationship between the numerology and the pilot pattern, or a corresponding relationship between parameters in numerology and the pilot pattern. Herein, the numerology is at least one basic parameter for determining a time-domain transmission unit and a frequency-domain transmission unit that are used to transmit the signal.

It is to be noted that the corresponding relationship between the numerology and the pilot pattern or the corresponding relationship between the parameters in the numerology and the pilot pattern may be appointed by the network side device and the terminal device in advance; or the network side device may also directly send indication information to the terminal device, and the indication information is used for indicating pilot patterns corresponding to different numerologies, or the indication information is used for indicating pilot patterns corresponding to the parameters in the numerology.

For example, when the parameters in the numerology include a sub-carrier spacing, the corresponding relationship between the sub-carrier spacing and the pilot pattern may be as illustrated in table 2.

TABLE 2

Corresponding Relationship between Sub-carrier Spacing and Pilot Pattern

| Sub-carrier spacing | Pilot pattern |
| --- | --- |
| 15 kHz | Pilot pattern 1 |
| 30 kHz | Pilot pattern 2 |
| 60 kHz | Pilot pattern 3 |
| 120 kHz | Pilot pattern 4 |

In the table 2, when the sub-carrier spacing is 15 kHz, the corresponding pilot pattern is the pilot pattern 1; when the sub-carrier spacing is 30 kHz, the corresponding pilot pattern is the pilot pattern 2; when the sub-carrier spacing is 60 kHz, the corresponding pilot pattern is the pilot pattern 3; and when the sub-carrier spacing is 120 kHz, the corresponding pilot pattern is the pilot pattern 4.

Optionally, also for example, when the parameters in the numerology include the sub-carrier spacing, the corresponding relationship between the sub-carrier spacing and the pilot pattern may be as illustrated in table 3.

TABLE 3

Corresponding Relationship between Sub-carrier Spacing and Pilot Pattern

| Sub-carrier spacing | Pilot pattern |
| --- | --- |
| 15 kHz | Pilot pattern 1 |
| | Pilot pattern 2 |
| 30 kHz | Pilot pattern 3 |
| | Pilot pattern 4 |

In the table 3, when the sub-carrier spacing is 15 kHz, the corresponding pilot pattern subset includes the pilot pattern 1 and the pilot pattern 2; and when the sub-carrier spacing is 30 kHz, the corresponding pilot pattern subset includes the pilot pattern 3 and the pilot pattern 4.

Herein, the difference between the table 2 and the table 3 lies in that one sub-carrier spacing in the table 2 corresponds to one pilot pattern and one sub-carrier spacing in the table 3 may correspond to multiple pilot patterns. In other words, each sub-carrier spacing in the table 3 may correspond to one pilot pattern subset and the pilot pattern subset includes multiple pilot patterns.

In this way, the terminal device may determine the first pilot pattern according to the corresponding relationship between the numerology and the pilot pattern or according to the corresponding relationship between the parameters in the numerology and the pilot pattern, and thus flexibly adjusts the pilot density and the occupied physical resource.

It should be understood that the corresponding relationships in table 1 to table 3 are merely for example in the description and are not limited to these in fact.

Optionally, as another embodiment, the numerology information includes at least one of: a sub-carrier spacing, the number of sub-carriers under a special bandwidth, the number of sub-carriers in a PRB, the length of an OFDM symbol, the number of points of Fourier transform or inverse Fourier transform for generating an OFDM signal, the number of OFDM symbols in a TTI, the number of TTIs in a predetermined duration or the length of a signal prefix.

Herein, the sub-carrier spacing refers to a frequency spacing between adjacent sub-carriers, such as 15 kHz and 60 kHz; the number of sub-carriers under the special bandwidth may be, for example, the number of sub-carriers corresponding to each possible system bandwidth; the number of sub-carriers in the PRB typically may be, for example, an integer multiple of 12; the number of OFDM symbols in the TTI typically may be, for example, an integer multiple of 14; the number of TTIs in a certain time unit may be the number of TTIs within the 1 ms or 10 ms, and the length of the signal prefix may be, for example, the duration of a CP of a signal, or a normal CP or an extended CP.

To sum up, the terminal device may determine the first pilot pattern according to at least one of the aforementioned types of information. It is to be noted that parts of the aforementioned types of information may be combined in use. For example, the pilot pattern configuration information sent by the network side device is combined with the movement speed estimation value information of the terminal device. The embodiment in which the pilot pattern configuration information is used in conjunction with the movement speed estimation value information of the terminal device will be described below.

Optionally, as an embodiment, the method 200 may further include the following operations.

Before the terminal device determines the first pilot pattern from the multiple pilot patterns according to the pilot pattern configuration information indicated by the first DCI, the terminal device reports the movement speed estimation value information to the network side device, where the movement speed estimation value information is used by the network side device for determining the pilot pattern configuration information.

Specifically, the terminal device may report the movement speed estimation value of the terminal device itself to the network side device, so that the network side device determines the pilot pattern used by the terminal device, according to the movement speed estimation value. In other words, the network side device may determine the pilot pattern configuration information according to the movement speed estimation value of the terminal device and indicate the pilot pattern configuration information to the terminal device by a downlink instruction (such as the first DCI). Herein, the terminal device may quantize the movement speed estimation value and then report the quantized movement speed estimation value to the network side device.

It is to be noted that the network side device may know the transmission mode information or the numerology information of the terminal device, whereas the movement speed estimation value of the terminal device needs to be reported by the terminal device to the network side device.

Optionally, as an embodiment, after the S210, the method 200 may further include the following operations.

The terminal device reports information of the first pilot pattern to the network side device.

Specifically, the terminal device may report the information of the first pilot pattern to the network side device by an uplink control channel, so that the network side device determines a resource position of the pilot signal according to the first pilot pattern and thus performs channel estimation based on the pilot signal.

Optionally, as an embodiment, the multiple pilot patterns include a zero pilot pattern, and the zero pilot pattern indicates that no time-frequency resource is used for transmitting the pilot signal.

Specifically, in this embodiment of the disclosure, the pilot resource corresponding to at least one of the multiple pilot patterns is unused, which indicates that the pilot signal does not need to be transmitted in the current transmission time unit. For example, when the movement speed of the terminal device is slow, the multiple pilot patterns may include the zero pilot pattern. For example, in four pilot patterns, one OFDM signal is occupied by the pilot pattern 2, two OFDM signals are occupied by the pilot pattern 3, three OFDM signals are occupied by the pilot pattern 4 and no OFDM signal is occupied by the pilot pattern 1, where the pilot pattern 1 is the zero pilot pattern.

Therefore, according to the method for transmitting the pilot signal in the embodiment of the disclosure, the terminal device may determine the first pilot pattern from the multiple pilot patterns and determine the time-frequency resource for transmitting the pilot signal according to the first pilot pattern, so that the pilot density and the occupied physical resource can be adjusted flexibly.

In order to facilitate a person skilled in the art to understand the technical solutions of the disclosure, the embodiment of the disclosure will be described below with reference to a DMRS pilot signal and a CSI-RS pilot signal for examples. It should be understood that the embodiment is not constituted as a limit to the disclosure.

Figure 3:
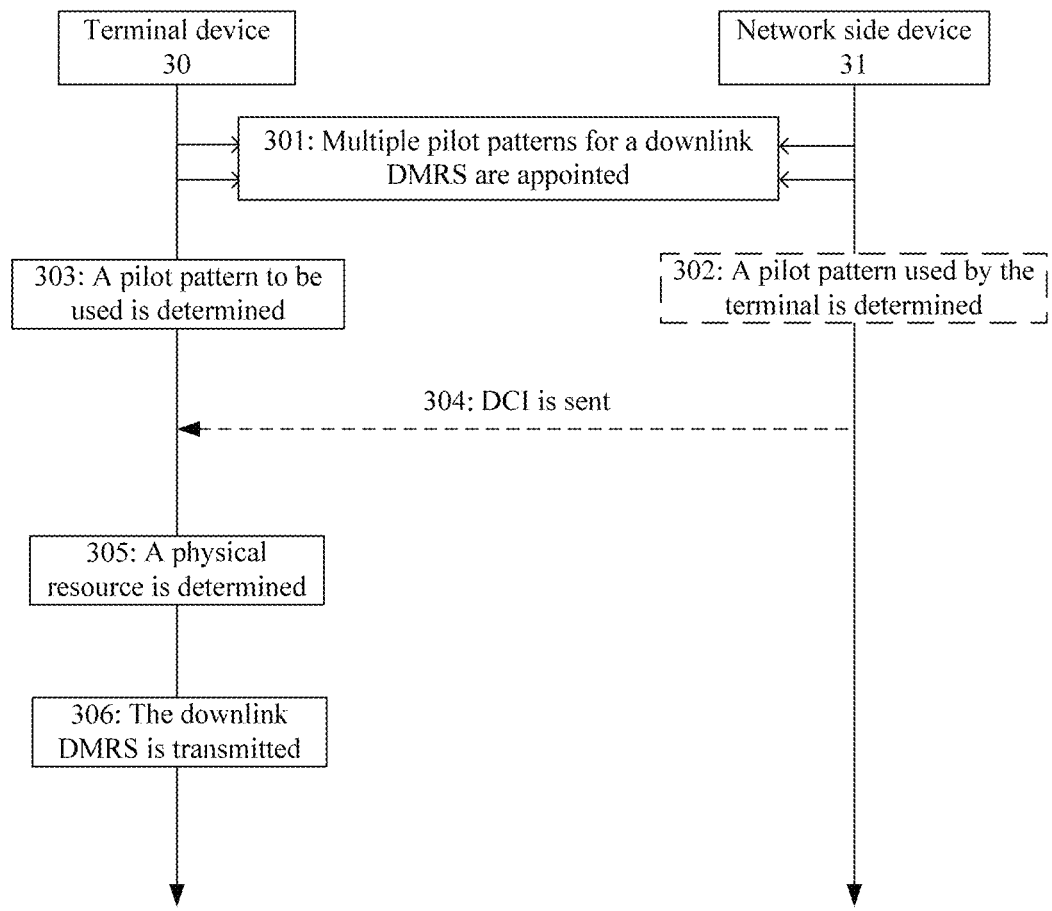
FIG. 3 is a schematic diagram of an example for transmitting a pilot signal according to an embodiment of the disclosure.

For example, for a downlink DMRS, as illustrated in FIG. 3, the method may specifically include the following operations.

At S301, a terminal device 30 and a network side device 31 appoint multiple pilot patterns used by the downlink DMRS.

The pilot patterns appointed by the terminal device 30 and the network side device 31 are the pilot pattern 1, the pilot pattern 2, the pilot pattern 3 and the pilot pattern 4, where there is no pilot RE in the pilot pattern 1, one OFDM symbol is occupied by the pilot signal in the pilot pattern 1, two OFDM symbols are occupied by the pilot signal in the pilot pattern 2, and three OFDM symbols are occupied by the pilot signal in the pilot pattern 3. The pilot pattern 1 does not need to transmit the pilot signal.

Optionally, in the S302, the network side device 31 determines a pilot pattern used by the terminal device.

The network side device 31 may select an appropriate DMRS pilot pattern for the terminal device 30 according to a change condition of a current channel. For example, when the channel changes quickly, the pilot pattern occupying more OFDM symbols is selected; and when the channel changes slowly, the pilot pattern occupying less OFDM symbols is selected.

At S303, the terminal device 30 determines a pilot pattern to be used.

Specifically, the terminal device 30 may select an appropriate pilot pattern from the multiple pilot patterns. For example, the pilot pattern is determined in combination with information such as a current movement speed value of the terminal device 30, a transmission mode used for data transmitted on a time-domain resource same as a time-domain resource transmitting the downlink DMRS signal or on a frequency-domain resource same as a frequency-domain resource transmitting the downlink DMRS signal, a numerology for the downlink DMRS signal, and a numerology used for the data transmitted on a time-domain resource same as a time-domain resource transmitting the downlink DMRS signal or on a frequency-domain resource same as a frequency-domain resource transmitting the downlink DMRS signal.

Optionally, in the S304, the network side device 31 sends DCI.

Optionally, the network side device 31 may schedule downlink data transmission of the terminal device 30 by the DCI. Moreover, the DMRS pilot pattern used by the terminal device 30 is indicated using two bits in the DCI.

At S305, the terminal device 30 determines a physical resource used by the downlink DMRS.

The terminal device 30 may determine the physical resource used by the downlink DMRS according to a pilot pattern selected by the mobile device itself. Optionally, when receiving the DCI, the terminal device 30 may also determine, according to a DMRS pilot pattern indicated by the DCI, the physical resource used by the downlink DMRS.

At S306, the terminal device 30 transmits the downlink DMRS.

The terminal device 30 receives the downlink DMRS for demodulating downlink data on the physical resource so as to perform downlink channel estimation according to the received downlink DMRS and demodulate the downlink data. Herein, the downlink data and the downlink DMRS signal transmitted by the network side device 31 to the terminal device 30 are in a same sub-frame.

Therefore, in the embodiment, the terminal device 30 may determine the physical resource for transmitting the downlink DMRS according to the pilot pattern indicated by the network side device 31 and thus transmits the downlink DMRS.

Figure 4:
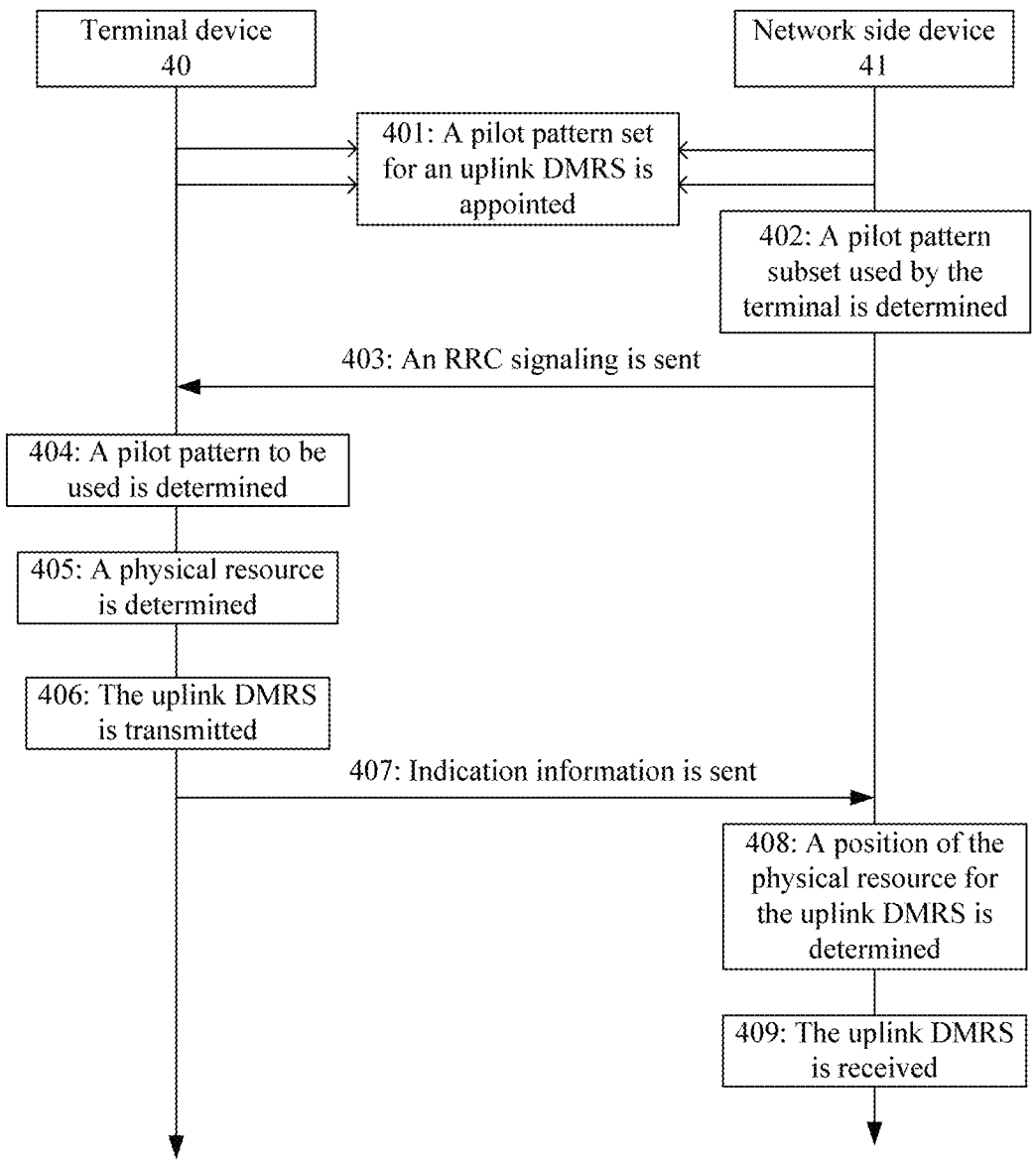
FIG. 4 is a schematic diagram of another example for transmitting a pilot signal according to an embodiment of the disclosure.

Also for example, for an uplink DMRS, as illustrated in FIG. 4, the method may specifically include the following operations.

At S401, a terminal device 40 and a network side device 41 appoint a pilot pattern set used by the uplink DMRS.

The terminal device 40 and the network side device 41 may appoint the pilot pattern set that may be used by the uplink DMRS, the pilot pattern set includes four pilot patterns and the four pilot patterns are provided with different pilot resource densities.

At S402, the network side device 41 determines a pilot pattern subset used by the terminal device 40.

The network side device 41 may also determine the pilot pattern subset used for the terminal device 40 in the pilot pattern set. For example, the pilot pattern subset includes the pilot pattern 2 and the pilot pattern 4. Herein, the network side device 41 may determine the pilot pattern subset according to a change condition of a channel. For example, when the channel changes quickly, the pilot pattern occupying more OFDM symbols is selected; and when the channel changes slowly, the pilot pattern occupying less OFDM symbols is selected. Also for example, the network side device 41 may adjust the pilot pattern subset according to previous channel estimation performance.

At S403, the network side device 41 sends an RRC signaling.

The network side device 41 may notify the terminal device 40 of the determined pilot pattern subset by the RRC signaling. During specific implementation, the network side device 41 may indicate the terminal device 40 of a current available pilot pattern subset in the appointed pilot pattern set by way of identifier values (i.e., bitmap), so that the terminal device 40 selects the appropriate pilot pattern in the pilot pattern subset.

At S404, the terminal device 40 determines a pilot pattern to be used.

Specifically, the terminal device 40 may select the appropriate pilot pattern from the pilot pattern subset by itself. For example, the terminal device 40 selects the appropriate pilot pattern in combination with information such as a current movement speed value, a transmission mode used for data transmitted on a time-domain resource same as a time-domain resource transmitting the uplink DMRS signal or on a frequency-domain resource same as a frequency-domain resource transmitting the uplink DMRS signal, a numerology for the uplink DMRS signal, and a numerology used for the data transmitted on a time-domain resource same as a time-domain resource transmitting the uplink DMRS signal or on a frequency-domain resource same as a frequency-domain resource transmitting the uplink DMRS signal. For example, the terminal device 40 selects the appropriate pilot pattern according to the current movement speed estimation value. When the movement speed estimation value is less than the A, the pilot pattern 2 is selected; and when the movement speed estimation value is greater than or equal to the A, the pilot pattern 4 is selected.

Optionally, the terminal device 40 selects the appropriate pilot pattern from the pilot pattern subset according to the received RRC signaling, where the RRC signaling is used for indicating the pilot pattern subset.

At S405, the terminal device 40 determines a physical resource used by the uplink DMRS.

The terminal device 40 may determine the physical resource used by the uplink DMRS according to the pilot pattern selected by the terminal device itself and then transmits the uplink DMRS on the physical resource, where the uplink DMRS is used for demodulating uplink data.

At S406, the terminal device 40 transmits the uplink DMRS.

The terminal device 40 transmits the uplink DMRS for demodulating the uplink data on the physical resource. Herein, the downlink data and the downlink DMRS signal transmitted by the network side device 41 to the terminal device 40 are in a same sub-frame.

At S407, the terminal device 40 sends indication information to the network side device 41, here, the indication information is used for indicating the pilot pattern of the uplink DMRS.

The terminal device 40 selects the pilot pattern of the uplink DMRS from the pilot pattern subset by itself and feeds the pilot pattern back to the network side device 41 along with the uplink data.

At S408, the network side device 41 determines a position of the physical resource for the uplink DMRS.

The network side device 41 determines a position of a physical resource corresponding to the pilot pattern of the uplink DMRS according to the indication information sent by the terminal device 40.

At S409, the network side device 41 receives the uplink DMRS.

Specifically, the network side device 41 receives the uplink DMRS on the physical resource according to the physical resource determined, and then performs uplink channel estimation based on the uplink DMRS and demodulates the uplink data according to a result of the uplink channel estimation.

Therefore, in the embodiment, the terminal device 40 may determine the appropriate pilot pattern from the pilot pattern subset, and determines the physical resource for transmitting the uplink DMRS according to the pilot pattern, thus transmitting the uplink DMRS.

Figure 5:
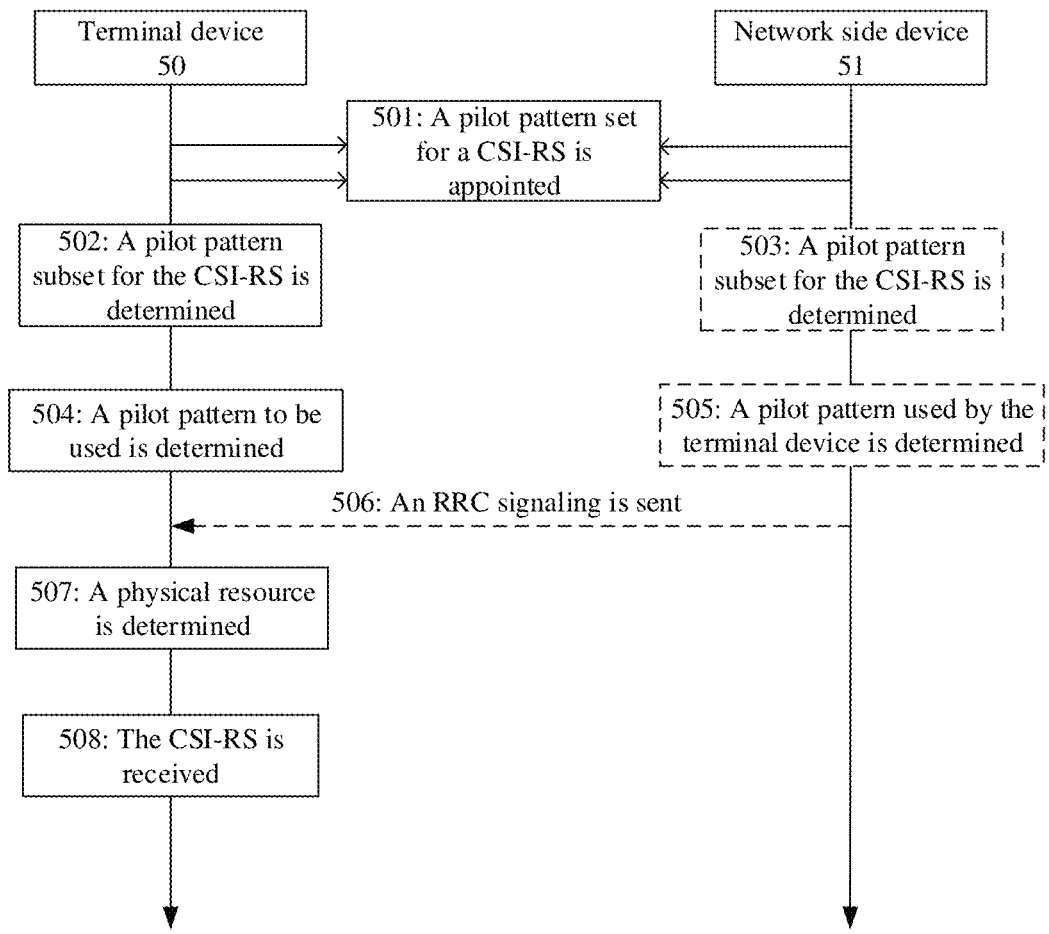
FIG. 5 is a schematic diagram of a still another example for transmitting a pilot signal according to an embodiment of the disclosure.

Also for example, for a CSI-RS, as illustrated in FIG. 5, the method may specifically include the following operations.

At S01, a terminal device 50 and a network side device 51 appoint a pilot pattern set for the CSI-RS.

For example, the pilot pattern set includes N pilot patterns. Optionally, the pilot pattern set may be defined in a protocol.

At S502, the terminal device 50 determines a pilot pattern subset for transmitting the CSI-RS.

Specifically, the terminal device 50 may determine, according to a numerology used at present, a pilot pattern subset corresponding to the numerology from the N pilot patterns. For example, the pilot pattern subset includes M pilot patterns and the M is smaller than or equal to the N. Herein, the numerology may be configured to the terminal device 50 by the network side device 51 through other signaling.

Optionally, in the S503, the network side device 51 may also determine a pilot pattern subset for transmitting the CSI-RS.

At S504, the terminal device 50 determines a pilot pattern used for transmitting the CSI-RS from the pilot pattern subset of the CSI-RS.

The terminal device 50 may determine the pilot pattern used for transmitting the CSI-RS according to a corresponding relationship between the numerology and the pilot pattern of the pilot pattern subset. Herein, the corresponding relationship between the numerology and the pilot pattern may be appointed by the network side device 51 and the terminal device 50 in advance. For example, the corresponding relationship is defined in a protocol.

Optionally, in the S505, the network side device 51 may also determine the pilot pattern for transmitting the CSI-RS.

Optionally, in the S506, the network side device 51 sends an RRC signaling.

The network side device 51 indicates the terminal device 50 of the pilot pattern used for the CSI-RS by sending the RRC signaling to the terminal device 50. Herein, the RRC signaling includes ⌈log 2(M)⌉ bits, here, ⌈⌉ indicates a ceiling operation.

At S507, the terminal device 50 determines a physical resource for transmitting the CSI-RS according to the pilot pattern for transmitting the CSI-RS.

The terminal device 50 may determine the physical resource used for transmitting the CSI-RS according to the pilot pattern, indicated by the RRC signaling, of the CSI-RS. Or the terminal device 50 may determine the physical resource used for transmitting the CSI-RS according to the pilot pattern selected by the terminal device itself.

At S508, the terminal device 50 receives the CSI-RS on the physical resource.

The terminal device 50 receives the CSI-RS on the physical resource according to the physical resource determined and performs downlink CSI measurement based on the received CSI-RS.

Therefore, in the embodiment, the terminal device 50 may determine the appropriate pilot pattern from the pilot pattern subset, and determines the physical resource for transmitting the pilot pattern according to the pilot pattern, thus receiving the downlink CSI-RS.

It should be understood that the schematic diagrams in FIG. 3 to FIG. 5 are merely for the convenience of understanding the technical solutions of the disclosure and are not constituted into the limits to the disclosure.

It should be understood that in each embodiment of the disclosure, sequence numbers of the foregoing processes do not mean the precedence of execution sequences. The execution sequences of the processes should be determined according to functions and internal logic of the processes, and should not be construed as any limitation on the implementation processes of the embodiments of the disclosure.

The foregoing describes the method for transmitting the pilot signal according to the embodiment of the disclosure from the terminal device. Hereinafter, the method for transmitting the pilot signal according to the embodiment of the disclosure will be described from the network side device.

Figure 6:
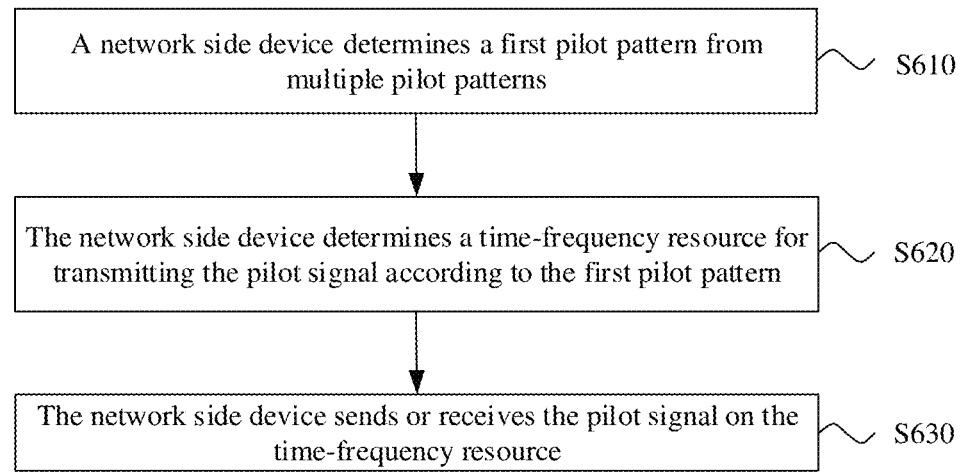
FIG. 6 is another schematic flowchart of a method for transmitting a pilot signal according to an embodiment of the disclosure.

FIG. 6 illustrates a schematic flowchart of a method 600 for transmitting a pilot signal according to an embodiment of the disclosure. The method 600 is executed by a network side device. For example, the network side device may be the base station 21 in FIG. 1. As illustrated in FIG. 6, the method 600 may include the following operations.

At S610, a network side device determines a first pilot pattern from multiple pilot patterns.

At S620, the network side device determines a time-frequency resource for transmitting the pilot signal according to the first pilot pattern.

At 630, the network side device sends or receives the pilot signal on the time-frequency resource.

In the embodiment of the disclosure, the network side device may determine the first pilot pattern from the multiple pilot patterns, then determine the time-frequency resource for transmitting the pilot signal according to the first pilot pattern, and send or receive the pilot signal on the time-frequency resource, so that the pilot density and the occupied physical resource can be adjusted flexibly and thus the pilot overhead is reduced.

For briefness, some terms, concepts or execution actions in the network side device similar as that in the terminal device will not be repeated specifically.

Optionally, the multiple pilot patterns are provided with different pilot resource densities, where the pilot resource densities include at least one of a time-domain resource density or a frequency-domain resource density.

Optionally, as an embodiment, the network side device determines the first pilot pattern from the multiple pilot patterns may include the following operations.

The network side device determines the first pilot pattern from the multiple pilot patterns according to at least one of: information of a transmission mode used for data transmitted on a time-domain resource same as a time-domain resource transmitting the pilot signal or on a frequency-domain resource same as a frequency-domain resource transmitting the pilot signal; movement speed estimation value information of a terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Optionally, as an embodiment, after the S610, the method 600 may further include the following operations.

The network side device sends to the terminal device pilot pattern configuration information indicated by first DCI, where the first DCI is used for scheduling the data transmitted on the time-domain resource same as the time-domain resource transmitting the pilot signal or on the frequency-domain resource same as the frequency-domain resource transmitting the pilot signal, and the pilot pattern configuration information is used for indicating the first pilot pattern.

Optionally, as an embodiment, the method 600 may further include the following operations.

The network side device receives the movement speed estimation value information sent by the terminal device.

Herein, the S610 may include the following operations.

The network side device determines the first pilot pattern from the multiple pilot patterns according to the movement speed estimation value information.

Specifically, the network side device may determine the first pilot pattern according to a movement speed estimation value reported by the terminal device.

Optionally, as an embodiment, the method 600 may further include the following operations.

The network side device receives information of the first pilot pattern reported by the terminal device.

Specifically, the network side device may determine a resource position of the pilot signal according to the received information of the first pilot pattern and thus perform channel estimation based on the pilot signal.

Optionally, as an embodiment, the multiple pilot patterns include a zero pilot pattern, and the zero pilot pattern indicates that no time-frequency resource is used for transmitting the pilot signal.

Optionally, as an embodiment, the method 600 may further include the following operations.

The network side device sends indication information to the terminal device, here, the indication information is used for indicating the multiple pilot patterns.

Optionally, the first pilot pattern indicates RE(s) for transmitting the pilot signal.

Therefore, according to the method for transmitting the pilot signal provided by this embodiment of the disclosure, the network side device can determine the first pilot pattern from the multiple pilot patterns according to a channel state or other transmission parameters, so that the pilot density and the occupied physical resource are adjusted flexibly.

The method for transmitting the pilot signal according to the embodiments of the disclosure is described above in detail. Hereinafter, the terminal device and the network side device according to the embodiments of the disclosure will be described.

Figure 7:
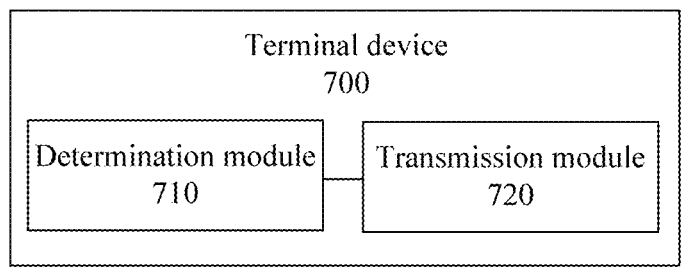
FIG. 7 is a schematic block diagram of a terminal device according to an embodiment of the disclosure.

FIG. 7 illustrates a schematic block diagram of a terminal device 700 according to an embodiment of the disclosure. As illustrated in FIG. 7, the terminal device 700 may include a determination module 710 and a transmission module 720.

The determination module 710 is configured to determine a first pilot pattern from multiple pilot patterns.

The determination module 710 is further configured to determine a time-frequency resource for transmitting the pilot signal according to the first pilot pattern.

The transmission module 720 is configured to send or receive the pilot signal on the time-frequency resource determined by the determination module.

In the embodiment of the disclosure, the terminal device may determine the first pilot pattern from the multiple pilot patterns and determine the time-frequency resource for transmitting the pilot signal according to the first pilot pattern, so that the pilot density and the occupied physical resource can be adjusted flexibly.

Optionally, the multiple pilot patterns are provided with different pilot resource densities, where the pilot resource densities include at least one of a time-domain resource density or a frequency-domain resource density.

Optionally, as an embodiment, the determination module 710 is specifically configured to determine the first pilot pattern from the multiple pilot patterns according to at least one: pilot pattern configuration information sent by a network side device; information of a transmission mode used for data transmitted on a time-domain resource same as a time-domain resource transmitting the pilot signal or on a frequency-domain resource same as a frequency-domain resource transmitting the pilot signal; movement speed estimation value information of the terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Optionally, as an embodiment, the terminal device may further include a receiving module.

The receiving module is configured to receive the pilot pattern configuration information, which is indicated by first DCI, from the network side device, where the first DCI is used for scheduling the data transmitted on the time-domain resource same as the time-domain resource transmitting the pilot signal or on the frequency-domain resource same as the frequency-domain resource transmitting the pilot signal.

Herein, the determination module 710 is specifically configured to determine the first pilot pattern from the multiple pilot patterns according to the pilot pattern configuration information indicated by the first DCI.

Optionally, as an embodiment, the transmission module 720 is further configured to report the movement speed estimation value information to the network side device, where the movement speed estimation value information is used by the network side device for determining the pilot pattern configuration information.

Optionally, as an embodiment, the numerology information includes at least one of: a sub-carrier spacing, the number of sub-carriers under a special bandwidth, the number of sub-carriers in a PRB, the length of an OFDM symbol, the number of points of Fourier transform or inverse Fourier transform for generating an OFDM signal, the number of OFDM symbols in a TTI, the number of TTIs in a predetermined duration or the length of a signal prefix.

Optionally, as an embodiment, the transmission module 720 is further configured to report information of the first pilot pattern to the network side device.

Optionally, as an embodiment, the multiple pilot patterns include a zero pilot pattern, and the zero pilot pattern indicates that no time-frequency resource is used for transmitting the pilot signal.

Optionally, as an embodiment, the transmission module 720 is further configured to receive indication information sent by the network device, here, the indication information is used for indicating the multiple pilot patterns.

In this embodiment of the disclosure, the pilot patterns indicate REs for transmitting the pilot signal.

The terminal device 700 according to the embodiment of the disclosure may execute the method 200 for transmitting the pilot signal according to the embodiments of the disclosure and the above and other operations and/or functions of each module in the terminal device 700 are respectively intended to implement corresponding processes of the foregoing each method, all of which will not be repeated herein for briefness.

Therefore, the terminal device in the embodiment of the disclosure may determine the first pilot pattern from the multiple pilot patterns and determine the time-frequency resource for transmitting the pilot signal according to the first pilot pattern, so that the pilot density and the occupied physical resource can be adjusted flexibly.

The terminal device according to the embodiments of the disclosure is described above in combination with FIG. 7. Hereinafter, the network side device according to the embodiments of the disclosure will be described in combination with FIG. 8.

Figure 8:
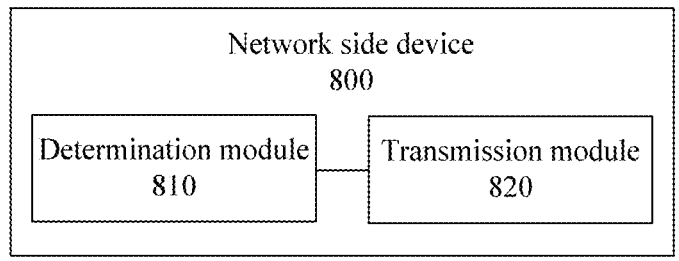
FIG. 8 is a schematic block diagram of a network side device according to an embodiment of the disclosure.

FIG. 8 illustrates a schematic block diagram of a network side device 800 according to an embodiment of the disclosure. As illustrated in FIG. 8, the network side device 800 may include a determination module 810 and a transmission module 820.

The determination module 810 is configured to determine a first pilot pattern from multiple pilot patterns.

The determination module 810 is further configured to determine a time-frequency resource for transmitting the pilot signal according to the first pilot pattern.

The transmission module 820 is configured to send or receive the pilot signal on the time-frequency resource.

In this embodiment of the disclosure, the network side device may determine the first pilot pattern from the multiple pilot patterns and determine the time-frequency resource for transmitting the pilot signal according to the first pilot pattern, so that the pilot density and the occupied physical resource can be adjusted flexibly.

Optionally, the multiple pilot patterns are provided with different pilot resource densities, where the pilot resource densities include at least one of a time-domain resource density or a frequency-domain resource density.

Optionally, as an embodiment, the determination module 810 is specifically configured to determine the first pilot pattern from the multiple pilot patterns according to at least one of: information of a transmission mode used for data transmitted on a time-domain resource same as a time-domain resource transmitting the pilot signal or on a frequency-domain resource same as a frequency-domain resource transmitting the pilot signal; movement speed estimation value information of a terminal device; or numerology information for transmitting the pilot signal or for data transmitted on a time-domain resource same as a time-domain resource transmitting the pilot signal or on a frequency-domain resource same as a frequency-domain resource transmitting the pilot signal.

Optionally, as an embodiment, the transmission module 820 is further configured to send to the terminal device pilot pattern configuration information indicated by first DCI, where the first DCI is used for scheduling the data transmitted on the time-domain resource same as the time-domain resource transmitting the pilot signal or on the frequency-domain resource same as the frequency-domain resource transmitting the pilot signal, and the pilot pattern configuration information is used for indicating the first pilot pattern.

Optionally, as an embodiment, the transmission module 820 is further configured to receive the movement speed estimation value information sent by the terminal device.

The determination module 810 is configured to determine the first pilot pattern from the multiple pilot patterns according to the movement speed estimation value information.

Optionally, as an embodiment, the transmission module 820 is further configured to enable the network side device to receive information of the first pilot pattern reported by the terminal device.

Optionally, as an embodiment, the multiple pilot patterns include a zero pilot pattern, and the zero pilot pattern indicates that no time-frequency resource is used for transmitting the pilot signal.

Optionally, as an embodiment, the transmission module 820 is further configured to send indication information to the terminal device, here, the indication information is used for indicating the multiple pilot patterns.

Optionally, the first pilot pattern indicates RE(s) for transmitting the pilot signal.

The network side device 800 according to the embodiment of the disclosure may execute the method 600 for transmitting the pilot signal according to the embodiments of the disclosure and the above and other operations and/or functions of each module in the network side device 800 are respectively intended to implement corresponding processes of the foregoing each method, all of which will not be repeated herein for briefness.

Therefore, in the embodiment of the disclosure, the network side device may determine the first pilot pattern from the multiple pilot patterns and determine the time-frequency resource for transmitting the pilot signal according to the first pilot pattern, so that the pilot density and the occupied physical resource can be adjusted flexibly.

Figure 9:
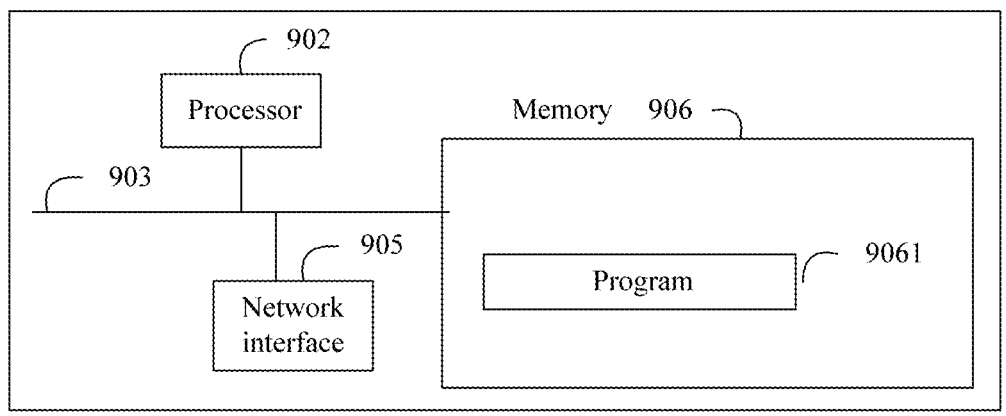
FIG. 9 is a structural diagram of a terminal device provided according to another embodiment of the disclosure.

FIG. 9 illustrates a structural diagram of a terminal device provided by a still another embodiment of the disclosure. The terminal device includes at least one processor 902 (such as a CPU), at least one network interface 905 or other communication interfaces, a memory 906 and at least one communication bus 903 for implementing connection communication among these units. The processor 902 is configured to execute an executable module stored in the memory 906, such as a computer program. The memory 906 may include a high-speed Random Access Memory (RAM) and may further include a non-volatile memory such as at least one disk memory. The communication connection with at least one of other network elements is implemented via the at least one network interface 905 (it may be wired or wireless).

In some implementation manners, the memory 906 stores a program 9061; the processor 902 executes the program 9061 and is configured to execute the method of the terminal device side for transmitting the pilot signal according to the above embodiments of the disclosure, which will not be repeated herein for briefness.

Figure 10:
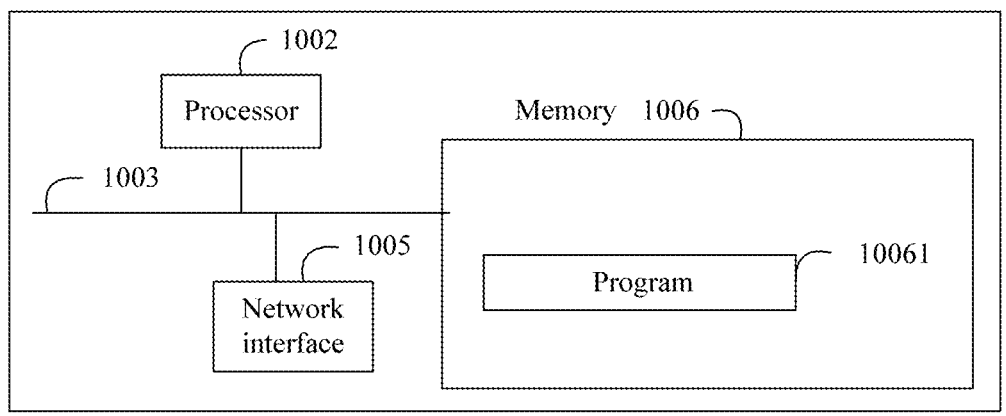
FIG. 10 is a structural diagram of a network side device provided according to another embodiment of the disclosure.

FIG. 10 illustrates a structure diagram of a network side device provided by a still another embodiment of the disclosure. The network side device includes at least one processor 1002 (such as a CPU), at least one network interface 1005 or other communication interfaces, a memory 1006 and at least one communication bus 1003 for implementing connection communication among these units. The processor 1002 is configured to execute an executable module stored in the memory 1006, such as a computer program. The memory 1006 may include a high-speed Random Access Memory (RAM) and may further include a non-volatile memory such as at least one disk memory. The communication connection with at least one of other network elements is implemented via the at least one network interface 1005 (it may be wired or wireless).

In some implementation manners, the memory 1006 stores a program 10061; the processor 1002 executes the program 10061 and is configured to execute the method of the network device side for transmitting the pilot signal according to the above embodiments of the disclosure, which will not be repeated herein for briefness.

It should be understood that the term "and/or" in the disclosure describes only an association relationship for describing associated objects and represents that three relationships may exist. For example, A and/or B may represent the following three cases: Only A exists, both A and B exist, and only B exists. In addition, the character "/" in the disclosure generally indicates an "or" relationship between the associated objects.

It should be understood that in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that in combination with the examples described in the embodiments disclosed in the disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the operations of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely implementation manners of the disclosure but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for transmitting a pilot signal, comprising:
    determining, by a network device, a first pilot pattern from a plurality of pilot patterns;
    determining, by the network device, a time-frequency resource for transmitting the pilot signal according to the first pilot pattern;
    sending, by the network device, indication information for indicating the plurality of pilot patterns;
    sending, by the network device, pilot pattern configuration information indicated by first Downlink Control Information (DCI) for scheduling data transmitted on a time-domain resource same as the time-domain resource transmitting the pilot signal, the pilot pattern configuration information being configured for a terminal device to determine the first pilot pattern from the plurality of pilot patterns and the first pilot pattern being configured for the terminal device to determine the time-frequency resource for transmitting the pilot signal; and
    sending or receiving, by the network device, the pilot signal on the time-frequency resource.

2. The method of claim 1, wherein the plurality of pilot patterns are provided with different pilot resource densities; and the pilot resource densities comprise at least one of a time-domain resource density or a frequency-domain resource density.

3. The method of claim 1, wherein determining, by the network device, the first pilot pattern from the plurality of pilot patterns comprises:
    determining, by the network device, the first pilot pattern from the plurality of pilot patterns according to at least one of:
    information of a transmission mode used for data transmitted on a time-domain resource same as a time-domain resource transmitting the pilot signal or on a frequency-domain resource same as a frequency-domain resource transmitting the pilot signal;
    movement speed estimation value information of the terminal device; or
    numerology information for transmitting the pilot signal or for data transmitted on a time-domain resource same as a time-domain resource transmitting the pilot signal or on a frequency-domain resource same as a frequency-domain resource transmitting the pilot signal.

4. The method of claim 3, further comprising:
    receiving, by the network device, the movement speed estimation value information;
    wherein determining, by the network device, the first pilot pattern from the plurality of pilot patterns comprises:
    determining, by the network device, the first pilot pattern from the plurality of pilot patterns according to the movement speed estimation value information.

5. The method of claim 1, further comprising:
    receiving, by the network device, information of the first pilot pattern.

6. The method of claim 1, wherein the plurality of pilot patterns comprise a zero pilot pattern, the zero pilot pattern indicating that no time-frequency resource is used for transmitting the pilot signal.

7. The method of claim 3, wherein the numerology information comprises at least one of:
    a sub-carrier spacing, a number of sub-carriers under a special bandwidth, a number of sub-carriers in a Physical Resource Block (PRB), a length of an Orthogonal Frequency Division Multiplexing (OFDM) symbol, a number of points of Fourier transform or inverse Fourier transform for generating an OFDM signal, a number of OFDM symbols in a Transmission Time Interval (TTI), a number of TTIs in a predetermined duration, or a length of a signal prefix.

8. A network device, comprising:
    a processor;
    a network interface; and
    a memory for storing computer program instructions that, when executed by the processor, cause the processor to perform a method for transmitting a pilot signal comprising:
    determining a first pilot pattern from a plurality of pilot patterns;
    determining a time-frequency resource for transmitting the pilot signal according to the first pilot pattern;
    sending, through the network interface, indication information for indicating the plurality of pilot patterns;
    sending, through the network interface, pilot pattern configuration information indicated by first Downlink Control Information (DCI) for scheduling data transmitted on a time-domain resource same as the time-domain resource transmitting the pilot signal, the pilot pattern configuration information being configured for a terminal device to determine the first pilot pattern from the plurality of pilot patterns and the first pilot pattern being configured for the terminal device to determine the time-frequency resource for transmitting the pilot signal; and
    sending or receiving, through the network interface, the pilot signal on the time-frequency resource.

9. The network device of claim 8, wherein the plurality of pilot patterns are provided with different pilot resource densities; and the pilot resource densities comprise at least one of a time-domain resource density or a frequency-domain resource density.

10. The network device of claim 8, wherein the processor is further configured to:
    determine the first pilot pattern from the plurality of pilot patterns according to at least one of:

information of a transmission mode used for data transmitted on a time-domain resource same as a time-domain resource transmitting the pilot signal or on a frequency-domain resource same as a frequency-domain resource transmitting the pilot signal;

movement speed estimation value information of the terminal device; or numerology information for transmitting the pilot signal or for data transmitted on a time-domain resource same as a time-domain resource transmitting the pilot signal or on a frequency-domain resource same as a frequency-domain resource transmitting the pilot signal.

11. The network device of claim 10, wherein the processor is further configured to:
receive the movement speed estimation value information through the network interface; and
determine the first pilot pattern from the plurality of pilot patterns according to the movement speed estimation value information.

12. The network device of claim 8, wherein the processor is further configured to receive information of the first pilot pattern.

13. The network device of claim 8, wherein the plurality of pilot patterns comprise a zero pilot pattern, the zero pilot pattern indicating that no time-frequency resource is used for transmitting the pilot signal.

14. The network device of claim 10, wherein the numerology information comprises at least one of:
a sub-carrier spacing, a number of sub-carriers under a special bandwidth, a number of sub-carriers in a Physical Resource Block (PRB), a length of an Orthogonal Frequency Division Multiplexing (OFDM) symbol, a number of points of Fourier transform or inverse Fourier transform for generating an OFDM signal, a number of OFDM symbols in a Transmission Time Interval (TTI), a number of TTIs in a predetermined duration, or a length of a signal prefix.

15. A non-transitory computer readable storage medium, having stored thereon computer program instructions that, when executed by a processor of a network device, cause the network device to perform a method for transmitting a pilot signal comprising:
determining a first pilot pattern from a plurality of pilot patterns;
determining a time-frequency resource for transmitting the pilot signal according to the first pilot pattern;
sending indication information for indicating the plurality of pilot patterns;
sending pilot pattern configuration information indicated by first Downlink Control Information (DCI) for scheduling data transmitted on a time-domain resource same as the time-domain resource transmitting the pilot signal, the pilot pattern configuration information being configured for a terminal device to determine the first pilot pattern from the plurality of pilot patterns and the first pilot pattern being configured for the terminal device to determine the time-frequency resource for transmitting the pilot signal; and
sending or receiving the pilot signal on the time-frequency resource.

16. The non-transitory computer readable storage medium of claim 15, wherein the plurality of pilot patterns are provided with different pilot resource densities; and the pilot resource densities comprise at least one of a time-domain resource density or a frequency-domain resource density.

17. The non-transitory computer readable storage medium of claim 15, wherein determining the first pilot pattern from the plurality of pilot patterns comprises:
determining the first pilot pattern from the plurality of pilot patterns according to at least one of:
information of a transmission mode used for data transmitted on a time-domain resource same as a time-domain resource transmitting the pilot signal or on a frequency-domain resource same as a frequency-domain resource transmitting the pilot signal;
movement speed estimation value information of the terminal device; or
numerology information for transmitting the pilot signal or for data transmitted on a time-domain resource same as a time-domain resource transmitting the pilot signal or on a frequency-domain resource same as a frequency-domain resource transmitting the pilot signal.

18. The non-transitory computer readable storage medium of claim 17, further comprising:
receiving the movement speed estimation value information;
determining the first pilot pattern from the plurality of pilot patterns according to the movement speed estimation value information.

19. The non-transitory computer readable storage medium of claim 15, further comprising:
receiving information of the first pilot pattern.

20. The non-transitory computer readable storage medium of claim 15, wherein the plurality of pilot patterns comprise a zero pilot pattern, the zero pilot pattern indicating that no time-frequency resource is used for transmitting the pilot signal.

* * * * *